(12) United States Patent
Moeckel et al.

(10) Patent No.: US 10,408,217 B2
(45) Date of Patent: Sep. 10, 2019

(54) CONTROLLING A COMPRESSOR OF A GAS TURBINE ENGINE

(71) Applicant: General Electric Company, Schenectady, NY (US)

(72) Inventors: Curtis William Moeckel, Cincinnati, OH (US); Andrew Breeze-Stringfellow, Montgomery, OH (US); Peter John Wood, Loveland, OH (US); Eric Andrew Falk, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 691 days.

(21) Appl. No.: 15/070,268

(22) Filed: Mar. 15, 2016

(65) Prior Publication Data

US 2017/0268520 A1  Sep. 21, 2017

(51) Int. Cl.
| | | |
|---|---|---|
| F04D 27/00 | (2006.01) |
| F04D 29/56 | (2006.01) |
| F04D 27/02 | (2006.01) |
| F02C 9/20 | (2006.01) |
| F02C 9/18 | (2006.01) |

(52) U.S. Cl.
CPC ............. *F04D 27/002* (2013.01); *F02C 9/20* (2013.01); *F04D 27/001* (2013.01); *F04D 27/0246* (2013.01); *F05D 2220/32* (2013.01); *F05D 2220/3219* (2013.01); *F05D 2270/1024* (2013.01); *F05D 2270/304* (2013.01); *F05D 2270/3015* (2013.01)

(58) Field of Classification Search
CPC .. F04D 27/002; F04D 27/001; F04D 27/0246; F04D 29/563; F02C 9/18; F02C 9/20; F05D 2220/32; F05D 2220/3219; F05D 2270/1024; F05D 2270/3015; F05D 2270/304

See application file for complete search history.

(56) References Cited

U.S. PATENT DOCUMENTS

| | | | |
|---|---|---|---|
| 5,042,245 A | * | 8/1991 | Zickwolf, Jr. ...... F04D 27/0246 60/773 |
| 5,594,665 A | * | 1/1997 | Walter .................. F04D 27/001 415/26 |
| 6,058,694 A | | 5/2000 | Ackerman et al. |
| 6,328,526 B1 | | 12/2001 | Seki et al. |

(Continued)

FOREIGN PATENT DOCUMENTS

WO  2014/052043 A1  4/2014

OTHER PUBLICATIONS

Extended European Search Report and Opinion issued in connection with corresponding EP Application No. 17160547.0 dated Jul. 28, 2017.

*Primary Examiner* — Richard A Edgar
(74) *Attorney, Agent, or Firm* — General Electric Company; William Scott Andes

(57) ABSTRACT

An apparatus and method of controlling a multi-stage compressor of a gas turbine engine having a front-block of stages with variable stator vanes (VSVs), a rear block of stages downstream of the front-block, and a bleed air off-take from at least one of the stages. The method includes sensing the pressure of the bleed air from the bleed air off-take and adjusting the position of the VSV for the front-block.

20 Claims, 3 Drawing Sheets

(56) References Cited

U.S. PATENT DOCUMENTS

| | | |
|---|---|---|
| 7,163,086 B2 | 1/2007 | Care et al. |
| 7,413,401 B2 | 8/2008 | Szucs et al. |
| 7,482,709 B2 | 1/2009 | Berenger |
| 8,083,030 B2 | 12/2011 | Portlock |
| 8,490,404 B1 | 7/2013 | Adibhatla et al. |
| 8,591,173 B2 | 11/2013 | Bouru et al. |
| 8,740,547 B2 | 6/2014 | Colotte et al. |
| 8,870,699 B2 | 10/2014 | Lewis et al. |
| 8,909,454 B2 | 12/2014 | Minto |
| 9,068,470 B2 | 6/2015 | Mills et al. |
| 2014/0093350 A1 | 4/2014 | Meisner et al. |
| 2016/0053721 A1* | 2/2016 | Fletcher .................... F02C 9/54 60/226.3 |

* cited by examiner

CONTROLLING A COMPRESSOR OF A GAS TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate within optimal pressure ratios. Maintaining these pressures within the compressor portion of the engine gives longevity to the life of a gas turbine engine.

BRIEF DESCRIPTION OF THE INVENTION

In one aspect, embodiments of the invention relate to a method of controlling a multi-stage compressor of a gas turbine engine having a front-block of stages with variable stator vanes (VSVs), a rear block of stages downstream of the front-block, and a bleed air off-take from at least one of the stages. The method includes sensing the pressure of the bleed air from the bleed air off-take, comparing the sensed pressure to a bleed air reference pressure, determining when the sensed bleed air pressure is out of balance with the bleed air reference pressure based on the comparison, and adjusting the position of the VSVs for the front-block to bring the sensed bleed air pressure into balance with the bleed air reference pressure.

In another aspect, embodiments of the invention relate to a method of operating a multi-stage compressor of a gas turbine engine by sensing a bleed air pressure in a bleed air off-take from the compressor and adjusting an operating position of variable stator vanes (VSVs) to maintain the bleed air pressure in balance with a bleed air reference pressure.

DESCRIPTION OF EMBODIMENTS OF THE INVENTION

The described embodiments of the present invention are directed to systems, methods, and other devices related to maintaining a balance between a reference pressure ratio and a real-time pressure ratio. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
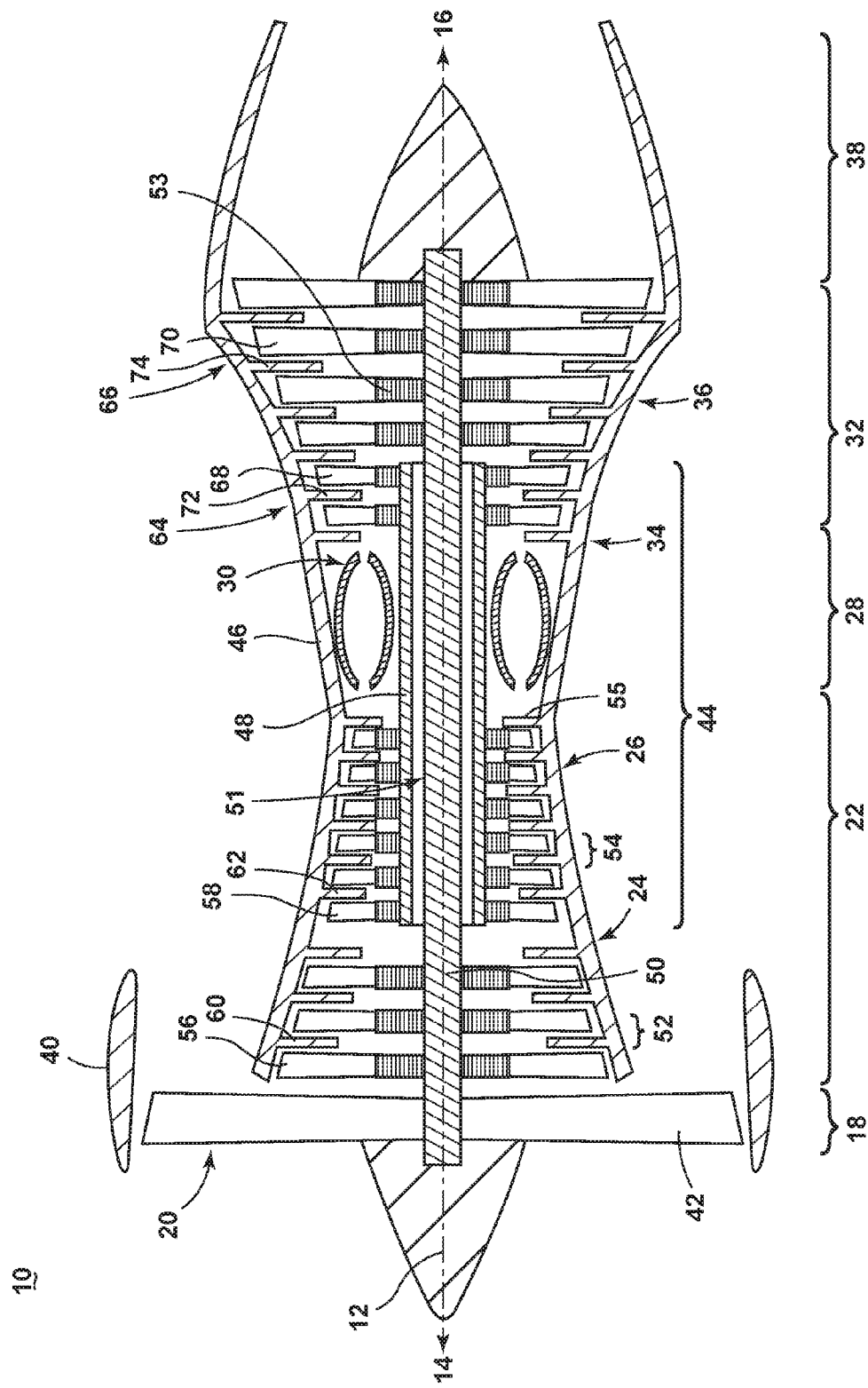
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54 in which a set of compressor blades 56, 58 rotate relative to a corresponding set of stationary compressor vanes 60, 62 to compress or pressurize the stream of fluid passing through the stage. In a single compressor stage 54, multiple compressor blades 58 can be provided in a ring and can extend radially outwardly relative to the engine centerline 12, from a blade platform to a blade tip, while the corresponding compressor vanes 62 are positioned downstream of and adjacent to the rotating blades 56. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk 53. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract power from the stream of fluid passing through the stage. In a single turbine stage 64, multiple turbine blades 68 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some power is extracted from these gases by the HP turbine 34, which drives the HP compressor 26. The combustion gases are discharged into the LP turbine 36, which extracts additional power to drive the LP compressor 24, and the exhaust gas is ultimately discharged from the engine 10 via the exhaust section 38. The power extracted by the LP turbine 36 drives the LP spool 50 to rotate the fan 20 and the LP compressor 24.

Figure 2:
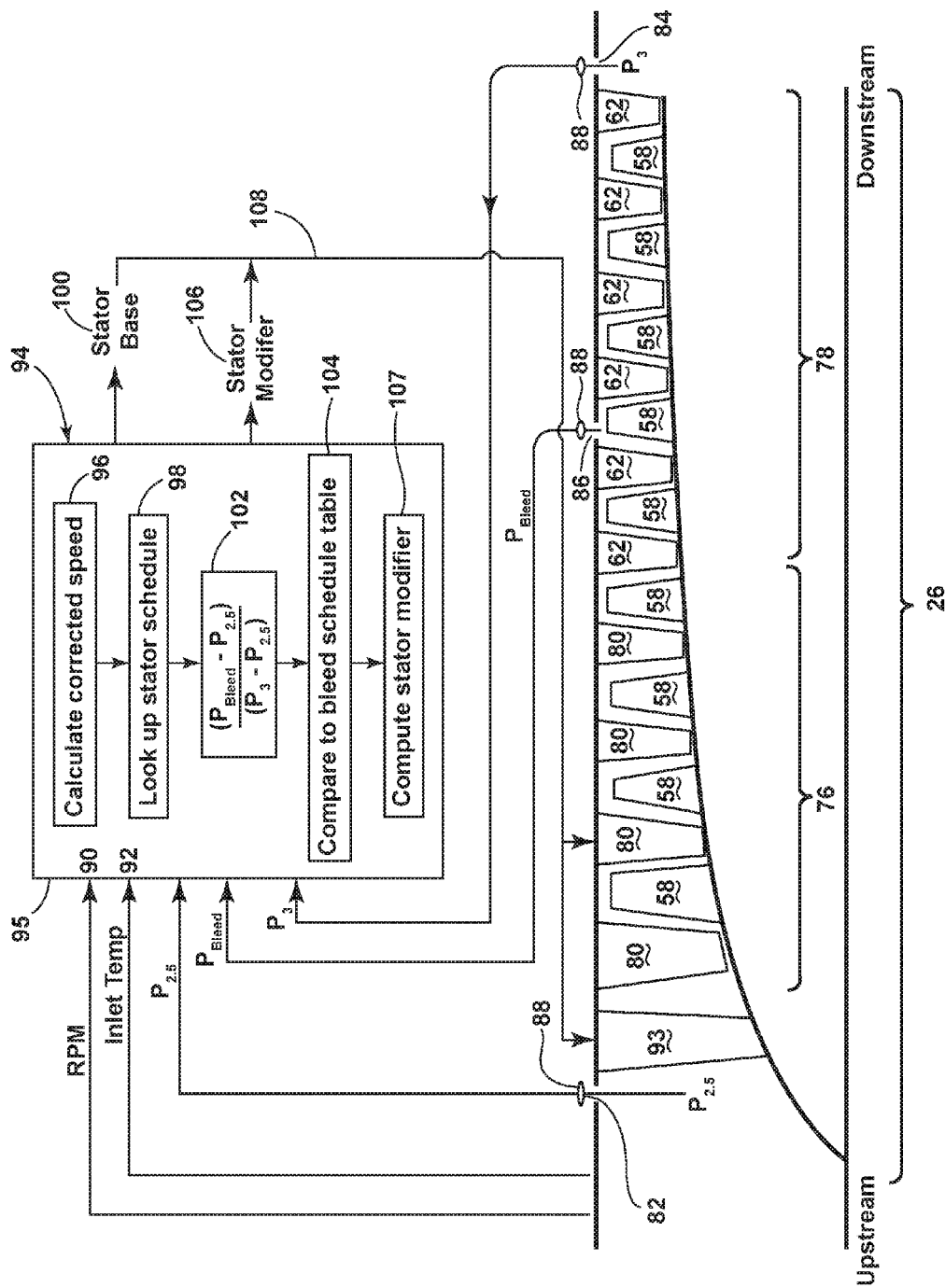
FIG. 2 is a schematic cross-sectional diagram of a compressor section for the gas turbine engine of FIG. 1.
Figure 3:
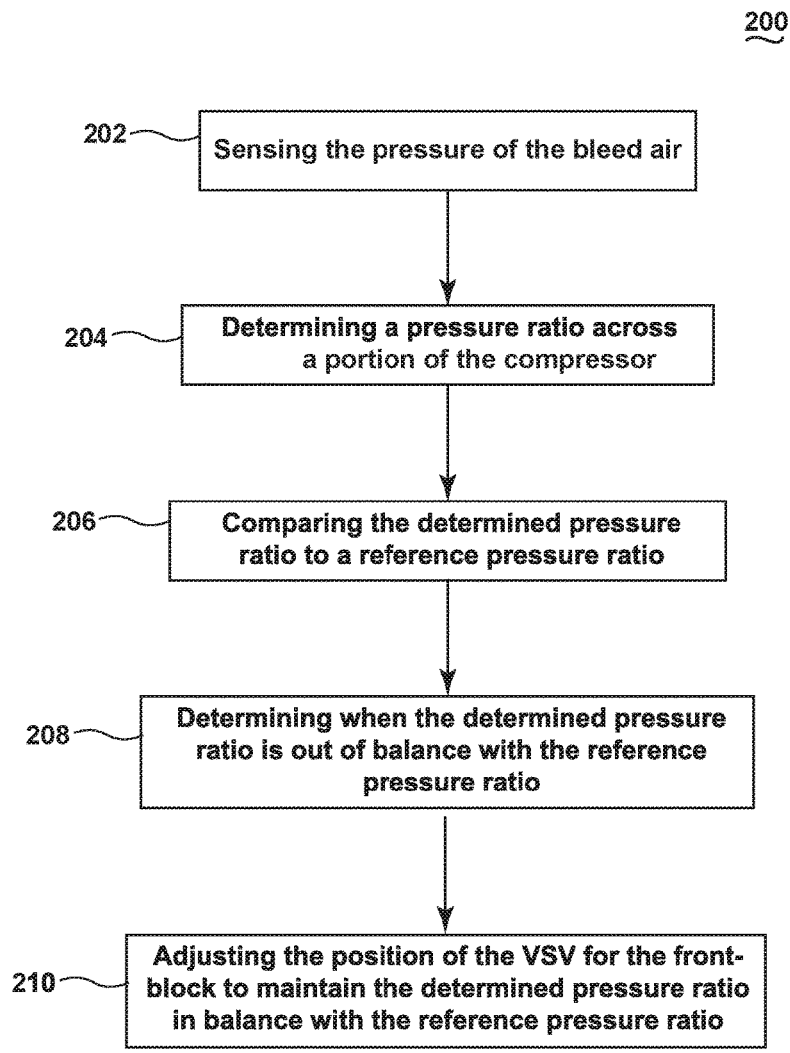
FIG. 3 is a flow diagram of a method for sensing bleed air pressure for the compressor of FIG. 2.

Referring to FIG. 2 a multi-stage compressor is illustrated as the HP compressor 26 including a front block of compressor stages 76 comprising at least one variable stator vane (VSV) 80 and a rear block of compressor stages 78 downstream of the front block including stationary compressor vanes 62. Each of the VSVs 80 can be adjusted to either increase or decrease the air flow through the compressor. The adjustment of the VSVs 80 typically include rotating the vanes to alter the stagger of the vanes according to a schedule. VSVs 80 and their operation are known in the art. Non-limiting examples of suitable adjustments for VSVs can be found in U.S. Pat. No. 7,413,401, to Szucs et al, filed Jan. 17, 2006, entitled "Methods and Apparatus for Controlling Variable Stator Vanes", U.S. Pat. No. 8,909,454, to Minto, filed Apr. 8, 2011, entitled "Control of Compression System with independently actuated inlet guide and/or stator vanes", U.S. Pat. No. 9,068,470, to Mills et al, filed Apr. 21, 2011, entitled "Independently-Controlled Gas Turbine Inlet Guide Vanes and Variable Stator Vanes", and U.S. Pat. No. 8,490,404, to Adibhatla et al, filed Feb. 28, 2012, entitled "Sensor-Based Performance-Seeking Gas Turbine Engine Control" which are herein incorporated by reference in full.

The front block of stages 76 includes an inlet 82 and the rear block of stages 78 includes an outlet 84. A bleed air off-take 86 is fluidly coupled radially outward of one of the blades 58 downstream or between the VSVs 80. Pressure sensors 88 are fluidly coupled to the inlet 82, outlet 84, and the bleed air off-take 86 for outputting corresponding pressure signals. $P_{2.5}$ represents the total air pressure at the inlet of the HP compressor 26. $P_{bleed}$ is the pressure signal indicative of the pressure of the fluid at the bleed air off-take 86 of the HP compressor 26. $P_3$ represents the total air pressure at the outlet 84 of the HP compressor 26. These pressure signals, $P_{2.5}$, $P_{Bleed}$, $P_3$, along with a rotational speed 90 and an inlet temperature 92 of the compressor, are received within a controller 94 to determine adjustments needed for the VSVs 80 to obtain the desired performance of the HP compressor.

The controller 94 is operably coupled to the front block 76 and configured to adjust the position of the VSVs 80 in response to the received inputs, $P_{2.5}$, $P_{Bleed}$, $P_3$, rotational speed 90, and inlet temperature 92. The controller calculates a corrected rotational speed 96, the speed at which the engine would operate if the inlet temperature corresponded to ambient temperatures at sea level on a standard day, using the rotational speed 90 and inlet temperature 92 data. This speed 96 is compared to corrected speed profiles in a stator schedule 98. A stator base signal 100 is determined based on the calculated corrected speed and the corresponding speed profile in the stator schedule 98 and output to the VSVs 80 for adjustment.

The stator schedule 98 is defined by a VSV 80 adjustment relative to corrected speed profiles stored for different operating scenarios such as ground idle, flight idle, take-off, cruise, or climb.

The pressure signals $P_{2.5}$, $P_{Bleed}$, $P_3$, are received within the controller and used to calculate a pressure ratio 102 which is a function of a first pressure difference between the outlet pressure, $P_3$, and inlet pressure, $P_{2.5}$, and a second pressure difference between the sensed bleed pressure, $P_{Bleed}$, and the inlet pressure, $P_{2.5}$, where the determined pressure ratio 102 is the ratio between the second and first pressure differences for a high pressure compressor:

$$(P_{Bleed}-P_{2.5})/(P_3-P_{2.5})$$

This determined pressure ratio 102 is compared to a reference pressure ratio, which can be a range of values, located in a bleed schedule table 104 from which a stator modifier signal 106 is calculated 107. The stator modifier signal 106 comprises a correction VSV position value necessary to maintain balance of the pressure ratio 102 with the reference pressure ratio. The controller 94 sends a signal 108 based on the stator base and modifier 100, 106 signals to some, all, or at least one of the VSVs 80 to adjust for the corrected speed profile while maintaining the pressure ratio 102 within a margin of the reference pressure ratio. For each corrected speed profile there is a corresponding pressure ratio, together comprising a corresponding modifier in the bleed schedule table 104, for example an output of 100% corrected speed would call for maintaining a 30% pressure ratio, or 80% corrected speed would call for maintaining a 10% pressure ratio.

The bleed schedule table 104 could incorporate corrections based on the deterioration of the compressor. As the engine ages, in order to maintain the bleed-offtake pressure balance the VSVs need to be closed. The amount of VSV closure will be determined iteratively by the control system to meet the bleed schedule. Adjusting the VSVs in the front stage 76 to maintain the bleed pressure ratio 102 in balance with the bleed air reference pressure ratio happens simultaneously and continuously. The amount of VSV trimming may be limited by other concerns, including aeromechanical responses, operability, temperature limitations, and rotational speed.

In addition, one of the VSVs could be a separately actuated inlet guide vane 93 with independent control. The position of this inlet guide vane can be used as another control parameter to help to balance the bleed pressure and balance requirements provided by signal 108. This additional control parameter along with the stator schedule 98 and bleed schedule table 104 are located in a memory 95 of the controller 94 and stored as data files.

A method 200 for controlling a multi-stage compressor includes first sensing 202 the pressure of the bleed air from the bleed air off-take 86. Then determining 204 pressure ratio 102 across a portion of the compressor based on the sensed bleed air pressure and comparing 206 the determined pressure ratio 102 to a reference pressure ratio. Then assessing 208 when the determined pressure ratio 102 is out of balance with the reference pressure ratio and adjusting 210 the position of the VSVs 80 of the front block to drive the determined pressure ratio 102 into balance with the reference pressure ratio.

This method helps to solve the problem of optimizing HP compressor bleed off-take pressures across the life of an engine, from a new engine to a fully deteriorated condition. In a new engine, producing required bleed off-take pressures can be challenging due to the high efficiency (e.g. tight clearances in the HP compressor rear block stages) which allow the rear block stages to pump higher levels of flow and decrease pressures in the front-block stages. This reduces the amount of pressure supplied to bleed off-takes. This method would measure the low bleed off-take pressures, recognize the deficiency, and open the front-block VSVs to increase the pressure as required. In a new engine there is also typically a larger margin between the optimal operating pressure ratio and the surge pressure ratio. This method makes use of that excess margin by opening the VSVs to increase the front-block loading and increase the bleed off-take pressures. In a deteriorated engine, operating with a sufficient margin can be more of a challenge. This method allows the VSVs to close in a deteriorated condition, remaining within the margins, and also providing a means to monitor bleed off-take pressures to meet secondary flow system requirements.

A technical advantage is to provide a feedback mechanism to maintain HP compressor bleed off-take pressures while also making use of, or improving, HP compressor operability margins. The invention can also provide a means of health monitoring for the HP compressor, as measured bleed off-take pressures may be correlated against HP compressor deterioration levels.

It should be appreciated that while illustrated as a collection of bleed offtakes in the radially outward position of a vane, a bleed offtake can be located in any suitable position for example but not limited to an inward/hub area.

It should be further appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a multi-stage high pressure compressor of a gas turbine engine having a front-block of stages with variable stator vanes (VSVs), a rear block of stages downstream of the front-block, and a bleed air off-take from at least one of the stages, the method comprising:
    sensing pressure of the bleed air from the bleed air off-take at a location between an inlet and an outlet of the high pressure compressor;
    determining a pressure ratio across a portion of the high pressure compressor based on the sensed bleed air pressure;
    comparing the determined pressure ratio to a reference pressure ratio;
    assessing when the determined pressure ratio is out of balance with the reference pressure ratio; and based on the comparison
    adjusting a position of the VSVs of the front-block to drive the determined pressure ratio into balance with the reference pressure ratio.

2. The method of claim 1 further comprising adjusting the position of the VSVs based on a rotational speed of the high pressure compressor.

3. The method of claim 2 further comprising adjusting the position of the VSVs relative to a stator schedule.

4. The method of claim 3 wherein adjusting the position of the VSVs relative to the stator schedule comprises determining a correction value for the stator schedule to hold a rotational speed of the high pressure compressor and the bleed air pressure.

5. The method of claim 1 wherein the determined pressure ratio is a function of a first pressure difference between an outlet pressure at the outlet of the high pressure compressor and an inlet pressure at the inlet of the high pressure compressor.

6. The method of claim 5 wherein the determined pressure ratio is a function of a second difference between the inlet pressure and the sensed bleed pressure.

7. The method of claim 6 wherein the determined pressure ratio is any function of the second and first pressure differences for the high pressure compressor.

8. The method of claim 1 wherein adjusting the position of the VSVs comprises adjusting the position of at least one of the VSVs.

9. The method of claim 8 wherein adjusting the position of the VSVs comprises adjusting the position of all of the VSVs.

10. The method of claim 9 wherein sensing the pressure of the bleed air off-take comprises sensing the pressure of a bleed air off-take downstream of at least one of the VSVs.

11. A multi-stage high pressure compressor for a gas turbine comprising:
    a front block of high pressure compressor stages having variable stator vanes (VSVs);
    a rear block of high pressure compressor stages located axially downstream of the front block of high pressure compressor stages;
    a bleed air off-take fluidly coupled to one of the stages;
    pressure sensors fluidly coupled to an inlet to the front block, an outlet to the rear block, and the bleed air off-take at a location between the inlet and the outlet, and outputting corresponding pressure signals indicative of the pressure of the fluid in the bleed air off-take, the inlet and the outlet; and
    a controller receiving the pressure signals as input and operably coupled to the front block and configured to adjust a position of the VSVs to maintain a pressure ratio of the bleed air pressure, relative to a reference pressure ratio.

12. The multi-stage high pressure compressor of claim 11 wherein the reference pressure ratio is located in a bleed schedule table.

13. The multi-stage high pressure compressor of claim 11 wherein the reference pressure ratio is a range.

14. The multi-stage high pressure compressor of claim 11 wherein the bleed air off-take is located in the rear block.

15. The multi-stage high pressure compressor of claim 11 wherein the bleed air off-take is located in the front block.

16. A method of operating a multi-stage high pressure compressor of a gas turbine engine by sensing a bleed air pressure in a bleed air off-take from the high pressure compressor at a location between an inlet and an outlet of the high pressure compressor and adjusting an operating position of variable stator vanes (VSVs) to maintain a pressure ratio between the bleed air pressure, inlet pressure, and outlet pressure of the high pressure compressor; wherein the bleed air pressure is determined at a location downstream of the inlet pressure.

17. The method of claim 16 further comprising adjusting the position of the VSVs according to a schedule based on the rotational speed of the high pressure compressor.

18. The method of claim 17 wherein the schedule is based on a corrected rotational speed of the high pressure compressor.

19. The method of claim 18 wherein a determined pressure ratio is a function of a difference between the bleed air pressure and the inlet pressure and the difference between the outlet pressure and the inlet pressure.

20. The method of claim 19 wherein at least one VSV is adjusted based on the determined pressure ratio based on a corresponding modifier in the schedule.

\* \* \* \* \*